July 2, 1940.  A. W. ENGEL  2,206,561
TRANSPARENT HOLDING DEVICE
Filed Jan. 12, 1939
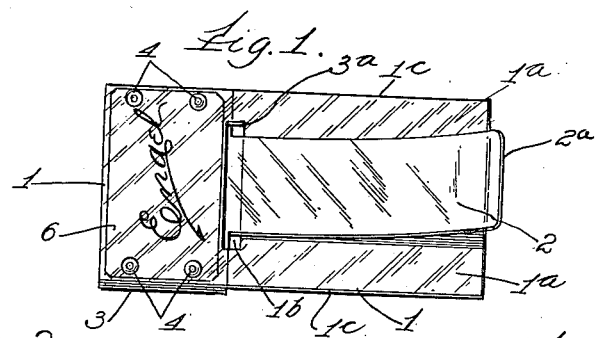
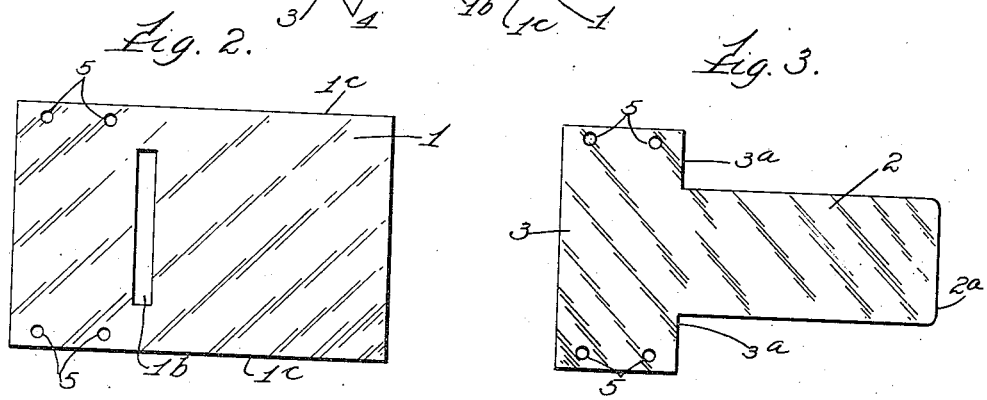
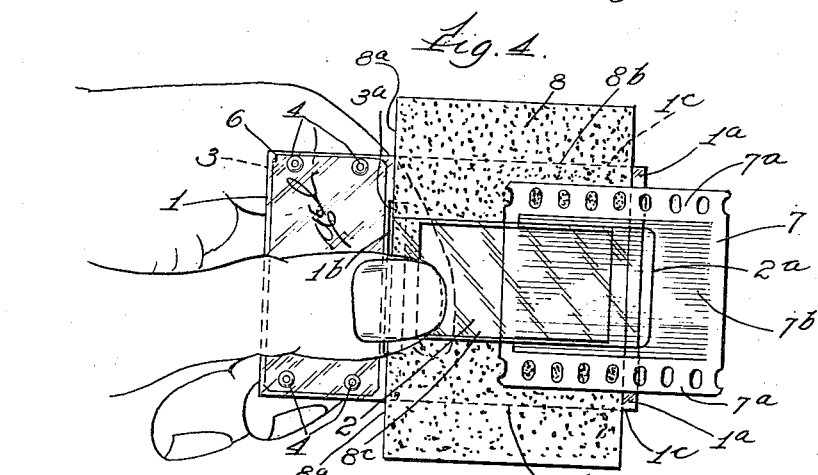
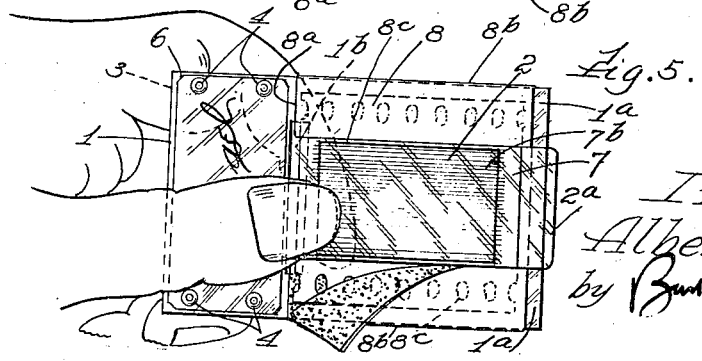
Inventor
Albert W. Engel
by Burton & Burton
Attys.

Patented July 2, 1940

2,206,561

UNITED STATES PATENT OFFICE 2,206,561

TRANSPARENT HOLDING DEVICE

Albert W. Engel, Chicago, Ill.

Application January 12, 1939, Serial No. 250,507

3 Claims. (Cl. 24—255)

This invention relates to a holding or gripping device which is made of transparent material. The purpose of the invention is to provide convenient means for temporarily holding one or more objects while they are being assembled or work is being done on them, and to afford a clear view of such objects to facilitate positioning or adjustment in the course of the process. It consists of certain features and elements in combination, as herein shown and described and as indicated by the claims.

In the drawing:

Fig. 1 is a perspective view of a holding device embodying this invention.

Fig. 2 is a plan view of the base member.

Fig. 3 is a plan view of the gripping member.

Fig. 4 is a face view showing the device in use as an aid to the assembly of a transparency and its mask.

Fig. 5 is a base view of the device showing a later step in the assembly of the parts shown in Fig. 4.

In the handling of various materials and elements involved in the process of manufacture or assembly, it is frequently desirable to have some means for gripping the materials in such a manner as to avoid finger prints, while at the same time rendering the parts available for inspection and adjustment in the holding device. An example of such a need arises in the assembly of the elements constituting transparencies such as lantern slides employed in projecting machines. When photographic films, particularly those of small size or "miniature" dimensions, are prepared for use in a projector, so that they may be thrown onto a screen in enlarged form for viewing, the film is preferably mounted between two cover glasses to protect it from dust and finger prints, and also from the heat of the projector lamp. In addition, it is desirable to provide a mask which definitely outlines the portion of the transparency which is to serve as the projected picture, and which supports the film in its proper position within the area of the cover glasses. The assembly of the film itself with such a mask is a fairly delicate operation, requiring careful adjustment of the film to the sight opening of the mask, so that the picture shall stand in the proper angular relation to the opening, and that desired portions of the picture shall be presented at the opening.

The holding device which is the subject of this invention is particularly well adapted for use in this work.

As shown in Fig. 1, it may be understood that the device is constructed mainly of Celluloid or similar transparent sheet material, and that it consists of a rectangular back plate, 1, and a gripping member comprising a tongue portion, 2, which is somewhat narrower than the back plate, and is preferably mounted thereover so as to occupy the middle portion of the width of the back plate, 1, leaving marginal portions, 1ª, exposed. These essential elements may be formed and assembled in various ways, but, as illustrated, the gripping tongue, 2, is provided with an integral head portion, 3, so that the two parts together form a T-shaped member, and the head portion may be of substantially the same width as the rectangular base member, 1. The flexible and transparent gripping tongue, 2, is secured to the base, 1, by means of any suitable fastening means, such as the eyelets, 4, which engage opposite ends of the cross member or head portion, 3. If the parts are cut to shape by means of suitable dies, these dies may include punches for forming holes, 5, both in the base member, 1, and in the head, 3, which will register accurately with each other and will receive the eyelets, 4, for permanent assembly.

Preferably, the base member, 1, is formed with a transverse slot, 1ᵇ, through which the tongue, 2, is passed in assembling the parts so that the head portion, 3, shall be disposed against the under side of the base plate, 1, while the tongue, 2, overlies the upper face thereof, as seen in Fig. 1. The slot, 1ᵇ, is somewhat longer than the width of the tongue, 2, so that portions of the transverse edges, 3ª, of the head, 3, are exposed at opposite ends of the slot, 1ᵇ, when the parts are assembled. These edges, 3ª, extend at right angles to the intersecting edges of the tongue portion, 2, and also at right angles to the lateral edges, 1ᶜ, of the base member, and are thus available as guides in a manner about to be described. If desired, a paper label or card, 6, bearing directions or instructions, or other data, may be assembled with the transparent parts by inserting it between the head portion, 3, and the base, 1, as seen in Fig. 1.

Figs. 4 and 5 illustrate the use of the device in assembling a transparent picture film, 7, with its paper mask, 8. The mask element, being preferably gummed on one surface, as indicated by the stipling in the drawing, is inserted between the base member, 1, and the tongue, 2, so that the portions of its edge, 8ª, contact the exposed portions of the transverse edges, 3ª, of the head, 3, in the ends of the slot, 1ᵇ. This squares up the mask with the base member, 1, and if the holding device is made for use with this particular mask, the width of the base member, 1, is exactly the same as the distance between scored lines, 8ᵇ, in the mask, at which it is intended to be folded. The flaps thus formed at the ends of the mask may be temporarily folded back along the lines, 8ᵇ, in registration with the edges, 1ᶜ, of the base, thus disposing the mask symmetrically on the holding device, with the tongue portion, 2, centered over the sight opening, 8ᶜ, of the mask.

The picture film is shown as of the miniature or candid camera type, which is usually made on motion picture film having marginal portions, 7ᵃ, perforated in the usual manner, and with the picture area, 7ᵇ, disposed between these marginal portions. The film is inserted between the transparent base member, 1, and the transparent tongue member, 2, in super-imposed position upon the mask, 3, and will be held lightly by the friction of the gripping members, 1 and 2. But its marginal portion, 7ᵃ, extending beyond the edges of the tongue, 2, may be engaged for shifting the film in adjusting it with respect to the sight opening, 8ᶜ, until the desired final position has been determined. Meanwhile, at any position of adjustment, it may be gripped tightly by pressure of the thumb and finger upon the opposite exposed faces of the transparent members, 1 and 2, as seen in Fig. 4. At the same time, the transparent elements will protect the film against finger prints, and this is particularly important in work of this character, because any such print on the surface of the film, which would be caused by direct handling of it, would be greatly enlarged in projecting the film on a screen, and would present a distinct and serious blemish in the picture.

When the film, 7, has been adjusted to its desired position on the mask, 8, the marginal portions of the mask defined by the scored lines, 8ᵇ, may be moistened and folded over to the positions indicated in Fig. 5, thus firmly securing the film in place and completing the assembly of the film and its mask. These parts are then removed from the holding device, 1, 2, and secured in any desired manner between cover glasses or other mounting for use in the projector.

Preferably, the end of the tongue at 2ᵃ extends slightly beyond the adjacent end of the base member, 1, so as to facilitate insertion of sheet material between the two parts of the gripping device. And it may be understood that the device, as illustrated in connection with its use for assembling a film and its mask, is dimensioned for this particular work, but that other dimensions and proportions may be employed to adapt the gripping device to other particular fields or processes, and, further, that for many purposes its exact dimensions and proportions are not important.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:

1. A holding device for the purpose indicated comprising a substantially rectangular sheet of transparent material, a flexible strip of transparent material overlying the middle portion of said sheet with marginal portions of the latter exposed at both sides of the strip, the strip and the sheet being secured together at one end, with the strip initially flexed away from the sheet to facilitate the insertion of sheet material to be frictionally held between the strip and the sheet for adjustment and inspection through the transparent strip.

2. A holding device for the purpose indicated comprising a substantially flat rectangular base member of transparent sheet material and a T-shaped member of flexible transparent sheet material, the base member having a slot extending transversely therein near one end and somewhat longer than the width of the stem portion of the T-shaped member, the latter being inserted through the slot and the cross member of the T-shaped element being secured flatly against the under side of the base member with a stem overlying the upper surface thereof to receive thin material between said stem and base, whereby such material may be frictionally held between the base and the tongue, and the cross member of the T-shaped element provides a transverse edge exposed at the slot of the base to serve as a stop for alignment and positioning of the thin material inserted between the two members.

3. A holding device for the purpose indicated comprising a substantially flat rectangular base member of transparent sheet material and a narrower member of flexible transparent sheet material, the base member having a slot extending transversely therein near one end and the narrower member being inserted through the slot with one end portion secured flatly against the under side of the base member causing the other end of the member to be sprung slightly away from the plane of the base member for facilitating entry of thin sheet materials between the two members to be held in place by pressing them toward each other.

ALBERT W. ENGEL.